United States Patent [19]
Schultz

[11] Patent Number: 4,678,017
[45] Date of Patent: Jul. 7, 1987

[54] WHEEL END VALVE FOR CENTRAL TIRE INFLATION SYSTEM

[75] Inventor: Gary R. Schultz, Portage, Mich.

[73] Assignee: Eaton Corporation, Cleveland, Ohio

[21] Appl. No.: 750,363

[22] Filed: Jul. 1, 1985

Related U.S. Application Data

[63] Continuation-in-part of Ser. No. 617,646, Jun. 4, 1984.

[51] Int. Cl.⁴ .............................................. B60C 29/00
[52] U.S. Cl. ................................... 152/416; 137/225;
137/859; 141/46; 152/415
[58] Field of Search ............... 152/415, 416, 417, 427;
141/95, 197, 38, 46; 137/102, 224, 226, 510,
625.18, 225, 859

[56] References Cited

U.S. PATENT DOCUMENTS

| | | | |
|---|---|---|---|
| 2,634,781 | 4/1953 | Turek | 137/224 |
| 2,976,906 | 3/1961 | Kamm et al. | 152/417 |
| 2,989,999 | 6/1961 | Holbrook et al. | 152/416 |
| 3,532,140 | 10/1970 | Hoffman | 152/415 |
| 4,203,467 | 5/1980 | Cardi | 137/510 X |
| 4,212,334 | 7/1980 | Dudar | 137/224 X |
| 4,437,504 | 3/1984 | Stumpe | 152/427 |

FOREIGN PATENT DOCUMENTS 1375258   9/1964   France .................................. 137/859

Primary Examiner—Donald E. Czaja
Assistant Examiner—Ramon R. Hoch
Attorney, Agent, or Firm—D. A. Rowe; H. D. Gordon

[57] ABSTRACT

A modular tire valve assembly (11) for a central tire inflation system (10) comprising a valve body (212) having only a first (66) and a second (72) fluid connection from the exterior to the interior thereof is provided. The first fluid connection comprises a first port connected to a selectively pressurized and exhausted conduit (52) and the second fluid connection comprises a second port connected to the interior pressurized chamber (74) of an inflatable tire (12). The assembly includes first valve means (220) responsive to pressurization and exhausting of said selectively pressurized and exhausted conduit to establish or block, respectively, fluid communication between said first and second ports and second valve means (280) responsive to pressurization in said interior tire chamber to maintain said first valve means in the closed position thereof if said interior tire chamber is pressurized below a predetermined reference pressure. The diaphragm valve means (220 and 280, respectively) are located at the interfaces of the first (202) and second (204) modules and of the second (204) and third (206) modules, respectively.

3 Claims, 9 Drawing Figures

WHEEL END VALVE FOR CENTRAL TIRE INFLATION SYSTEM

RELATED APPLICATION

This is a Continuation-In-Part of copending U.S. Ser. No. 617,646 filed June 4, 1984.

BACKGROUND OF THE INVENTION

1. Field of the Invention

The present invention relates to central tire inflation systems (CTIS), also known as onboard inflation systems and tire traction systems, wherein the inflation pressure of one or more vehicle tires may be controlled from a remote location (usually the vehicle cab) with the vehicle at rest and/or in motion and utilizing an onboard source of pressurized fluid (usually compressed air from the vehicle air brake compressor and/or a compressed air reservoir). In particular, the present invention relates to a valve assembly of modular construction mountable at the tire rim, or within the tire, which is vented only through the single conduit connecting same to the system control valves, which is effective to open and close in response to fluid pressure in the single conduit and which is effective to automatically fluidly isolate a tire when the pressure in the tire is less than a minimum reference pressure. In another embodiment, utilizing many of the same modules, the valve assembly is mountable at the tire rim and includes a quick dump valve portion for more rapid exhaust (deflation) of the tire.

2. Description of the Prior Art

Central tire inflation systems, also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737; 4,421,151 and 4,434,833, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desireable to decrease the tire pressure from the over-the-road or highway inflation pressure to increase riding comfort on rough roads. On the other hand, higherC tire pressures decrease rolling resistance and tire carcass temperatures on smooth roads thereby increasing economy and safety. Accordingly, in cross country vehicles it is desireable to change the inflation pressure in the pneumatic tires to fit the terrain and is also desireable that a system be provided for changing the inflation pressure of the tires from an onboard source, while the vehicle is at motion or at rest and that the system be controlled from the vehicle's operating cab. This is especially true for military vehicles which usually travel in columns whereby stoppage of the vehicle would delay the entire column. Additionally, if the military is under enemy attack, it is imperative that the vehicle maintain its maneuverability as long as is possible. If a tire has been damaged by gun fire or the like, it is desireable to be able to at least partially inflate the damaged tire, if possible, so that the vehicle remains mobile.

While CTIS are known in the prior art and have been utilized by the United States Army since at least World War II, the prior art system are not totally satisfactory as the systems utilize conduits, valves and/or seals which were located at exposed locations rendering same vulnerable to damage over rough terrain, utilize valves and/or conduits which required venting at the wheel hub location thus exposing same to malfunction as a result of clogging due to water, mud, snow or the like, do not provide for automatic isolation of a vehicle tire subject to extreme damage, subject the rotary seal members to a differential pressure during steady state operating conditions thereby decreasing the life thereof and increasing the likelihood of leakage, and/or require drilling of passages in the axle housing and/or hub assemblies which may tend to weaken same and/or render retrofit of a CTIS to an existing vehicle more difficult and costly.

SUMMARY OF THE INVENTION

In accordance with the present invention, the drawbacks of the prior art have been minimized or eliminated by the provision of a central tire inflation system utilizing rotary seals which are located in a well protected inboard location (see U.S. Pat. No. 4,434,833 assigned to the Assignee of this invention), utilizing valves and conduits of a relatively rugged proven construction including a wheel end valve assembly of modular construction having a firs embodiment which may be located inside the vehicle tire to protect the same, which requires only a single connection to pressurized fluid, which will automatically isolate a tire having less than a predetermined minimum reference pressure from the remainder of the system and which requires no venting to atmosphere at the vehicle wheel assembly and which provides all venting of the system at a location on the vehicle chassis above the vehicle fording level. In another embodiment, utilizing some of the same modules, the valve assembly is mounted outside of the tire but also includes rapid exhaust valve means for quicker venting (deflation) of the tire.

The above is accomplished by providing a central tire inflation system for a vehicle utilizing a valve assembly comprising a control valve and a low tire pressure shut-off valve at each wheel end assembly (usually a single or dual tire) which valve assembly is connected to the central control system by a single pressure line or conduit through a rotary seal assembly and pressurization of which single pressure conduit is effective to open and close communication to the vehicle tire and to cause inflation and/or deflation of said tire to a selected pressure. All system venting of the tires and the valve assembly is through the single pressure line or conduit and no provision for system venting of the tires and/or valve assembly at the wheel end is required unless more the rapid tire deflation embodiment is utilized.

The valves assembly, which comprises several modules, defines a body having only two ports, one connected to the interior of the tire and the other to the system supply conduit, may be located exteriorly of the tire or may be located interiorly of the tire such as in the bead lock portion thereof. The low tire pressure shutoff valve is effective to automatically isolate the tire associated therewith from the remainder of the central tire inflation system when the inflation preasure thereof is below a predetermined minimum reference value. To provide the more rapid tire deflation embodiment, one or more different modules, including the exhaust valving and porting, is assembled to one or more modules identical to those utilized in the first embodiment.

The single pressure conduit leading to the rotary seal at the wheel hub assembly is connected to a source of pressurized fluid through a plurality of control valves which are effective to open communication to the tire to measure the existing pressurization thereof, to cause inflation or deflation of the tire as required, to establish or block communication to the tire from the central tire inflation system and to exhaust the single pressure line during steady state conditions of the tire inflation system and to relieve pressure on the rotary seals. Preferably, the control valves, which may be separate or provided in a single valve block, are operated by a control, preferably a microprocessor control, which senses the tire inflation value selected by the operator, senses vehicle velocity and the current pressure condition of the vehicle air brake system.

Accordingly, it is an object of the present invention to provide a new and improved modular wheel end valve assembly for central tire inflation system.

A further object of the present invention is to provide an improved modular wheel end valve assembly for a central tire inflation system, preferable in a modular body having a single connection to the tire chamber and single connection to the source of pressurized fluid, which requires no venting other than through the single supply conduit, is effective in response to pressurization and venting of the supply conduit to open and close communication to the tire, and to isolate the tire if inflation pressure thereof falls below a minimum reference pressure.

These and other objects and advantages of the present invention will become apparent from a reading of the following description of the preferred embodiments taken in connection with the attached drawings.

BRIEF DESCRIPTION OF THE DRAWINGS

FIGS. 5 and 6 are sectional views of an alternate control and low tire pressure shut-off valve assembly mounting embodiment.

DESCRIPTION OF THE PREFERRED EMBODIMENT

Figure 1:
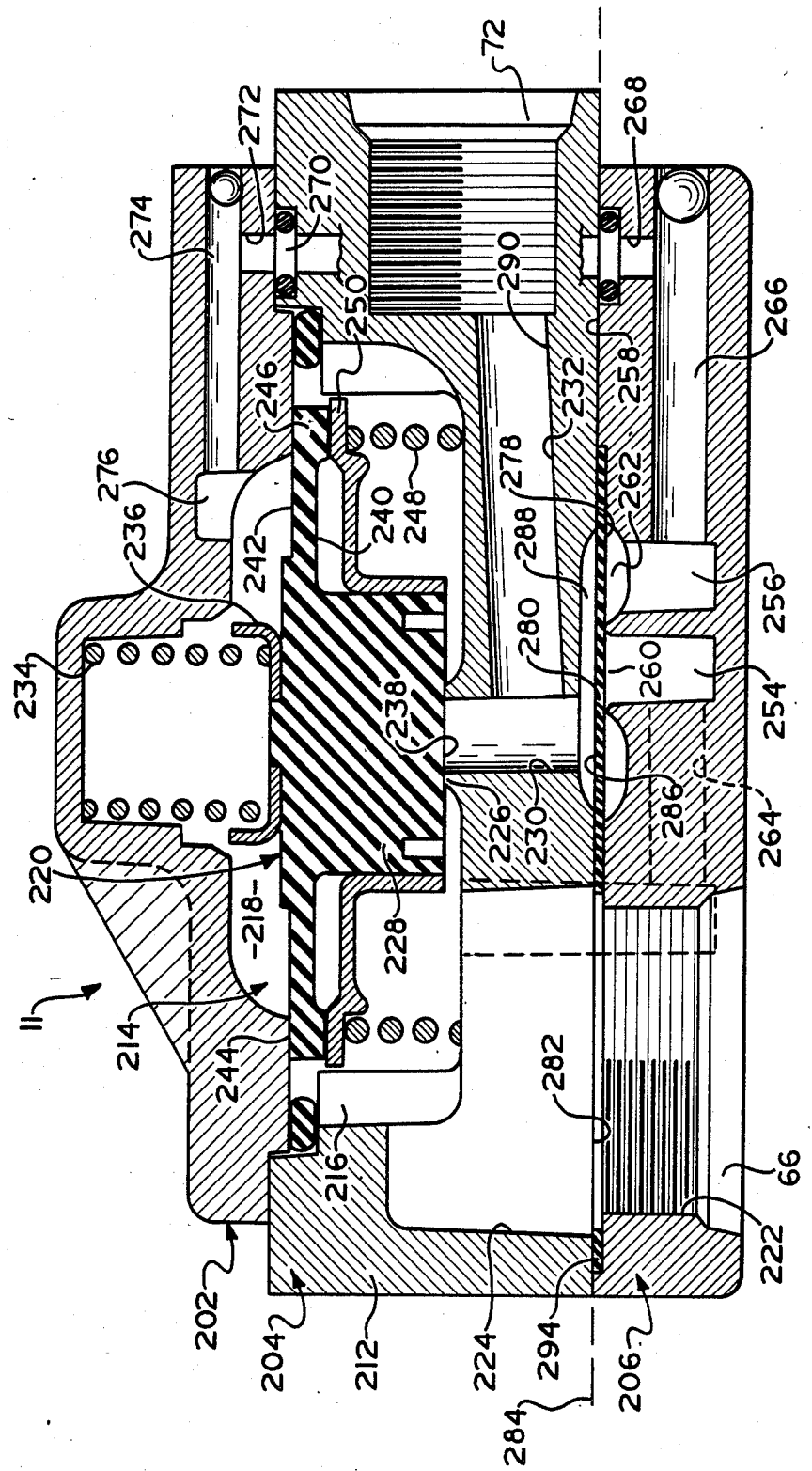
FIG. 1 is a front view, in section, of one embodiment of the wheel end valve assembly of the present invention taken along lines 1—1 in FIG. 2.

In the following description of the present invention, certain terms will be utilized for purposes of reference only and are not intended to be limiting. The terms "upward", "downward", "rightward" and "leftward" refer to directions in the drawings to which reference is made. The terms "inward", and "outward", respectively, refer to directions towards and away from, respectively, the geometric center of the device described. The terms "inflation" and "deflection", respectively, refer to increased and decreased, respectively, pressurization of a tire or the like. Said terminology will include the words above specifically mentioned, derivatives thereof and words of similar import.

Figure 8:
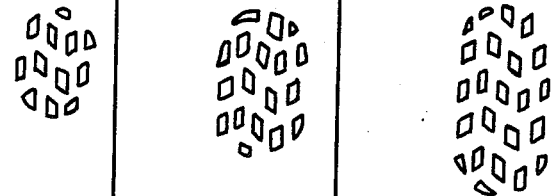
FIG. 8 is a diagrammatic representation of tire imprints at different tire inflation pressures.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to FIG. 8. Assuming, for example, the vehicle rear drive axle tires are normally inflated to about 75 psi (pounds per square inch) for highway operation, decreasing the tire inflation pressure to about 30 psi for cross country travel over rough road or to about 20 psi for operation in sand, mud or snow conditions will result in the tire having a greater contact area, (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desireable that the tire inflation pressures be controllable from the vehicle cab from an onboard source of pressurized fluid and be variable and maintainable with the vehicle in motion as well as when the vehicle as at rest. It is also highly desireable that the inflation pressure of the vehicle tires be variable and measurable independently of the central tire pressure inflation system for rapid checking and increasing or decreasing of the tire inflation pressure. This is especially desireable for initial inflation of the tires.

Figure 7:
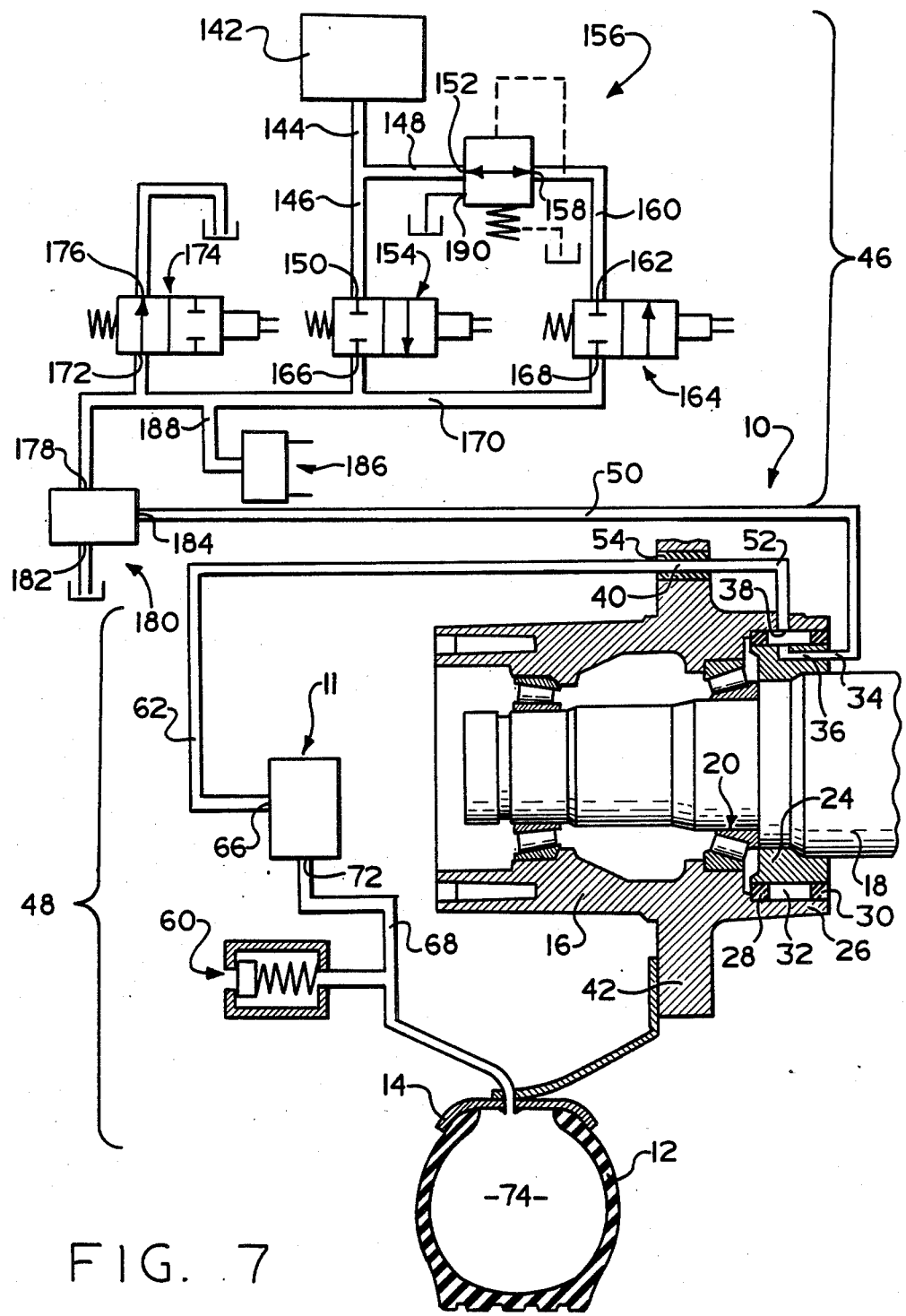
FIG. 7 is a schematic illustration of the pneumatic components of the CTIS in which the present invention is utilized to control the inflation of a single tire.

The pneumatic components of the central tire inflation system 10, in which the modular wheel end valve assembly 11 of the present invention is utilized, as utilized to control the inflation pressure of a single tire 12 may be seen in schematic representation by reference to FIG. 7. It is understood that valve assembly 11, which could be mounted interiorly of tire 12, is also advantageously utilizable with central tire inflation systems of modified arrangement.

Inflatable tire 12 is mounted to a tire rim 14 which is fixed to a wheel hub assembly 16 rotationally supported on the outer end of an axle housing 18 by means of bearings 20. An axle shaft (not shown) rotationally driven by conventional means, such as a differential (not shown), extends from the axle housing 18 and typically includes a flange (not shown) for drivingly connecting the axle shaft to the wheel hub. As may be seen in greater detail by reference to U.S. Pat. No. 4,434,833, assigned to the Assignee of this invention, an annular sleeve 24 may be pressed to the axle housing at a location inboard of the bearings 20 and the wheel hub may define and inboardly extending sleeve-type annular flange 26 telescopically surrounding sleeve 24. A pair of rotary seals 28 and 30 extend radially between the outer periphery of sleeve 24 and the inner periphery of sleeve-type flange 26 to define an annular sealed chamber 32 therebetween. Sleeve 24 is provided with an inlet 34 and a passage 36 opening to the chamber 32. Sleeve-type flange 26 is provided with a generally radially extending passage 38 extending from the sealed annular chamber 32 to the exterior outer diameter surface thereof. A single passage 40 may be provided in the radial flange portion 42 of the wheel hub 16 for passage of a pressure conduit. The above construction is described in above mentioned U.S. Pat. No. 4,434,833 and forms no part of the present invention. It is understood, of course, that the present invention is equally applicable to wheel hub/axle housing assemblies (also called "wheel-end assemblies") of other constructions.

The central tire inflation system 10 may be considered to comprise two components, a stationary component 46 fixed to the vehicle chassis and a rotational component 48 rotationally fixed to the wheel hub 16 and tire 12. The stationary component 46 is fluidly connected to the rotational component 48 by means of the annular chamber 32 defined by the rotary seals 28 and 30. Briefly, fluid conduit 50 from the stationary component 46 is fluidly connected to the inlet 34 of passage 36 formed in sleeve 24 while fluid conduit 52 leading to the rotational component 48 is fluidly connected to the passage 38 formed in sleeve-type flange 26 and passes through the opening 40 defined in the flange 42 of the hub 16. To protect conduit 52, a grommet or brushing 54 may be provided in the opening 40 or opening 40 may be defined by a bore in a wheel stud. Of course, alternatively, an internal passage may be provided in hub 16 opening to the outboard side of flange 42. Accordingly, initial installation and/or retrofit of system 10 to a vehicle is considerably simplified and will not weaken the load supporting structures of the axle housing and wheel hub. It is also noted that the rotary seals 28 and 30 and the conduit 50 leading to the wheel end assembly may be located at an inboard relatively protected location on the vehicle.

Rotating component 48 of system 10 includes the modular wheel end valve assembly 11 of the present invention, which assembly includes at least low pressure shutoff valve structure and control valve structure. The rotating component 48 also includes a manual inflate and pressure check valve 60. Valve assembly 11 may be located interiorly of tire 12.

A manifold portion 62 of conduit 52 connects port 66 of valve assembly 11 with the conduit 50 via chamber 32 while a manifold conduit 68 interconnects port 72 of valve assembly 11, the manual inflate and check valve 60, and the interior chamber 74 of the inflatable pneumatic tire 12. If dual tires are utilized, manifold conduit 68 may be split downstream of the valve 60 and manual shut-off valves provided to isolate the tires if required. Alternatively, line 62 may be split and a separate valve 11 provided for each tire of the dual tire set.

The initial inflate and pressure check valve 60 is located in manifold conduit 68, or may be located directly in the tire rim, and is located downstream of the valve assembly 11 for direct fluid communication to the interior chamber 74 of tire 12. Initial inflate and pressure check valve is of a standard tire valve stem construction as is well known in the prior art. It is important to note that valve assembly 11, which is located at the wheel end assembly, utilizes structures wherein venting to atmosphere thereof occurs solely through the manifold portion 62 of conduit 52, as will be described in greater detail below, and thus the valve assembly 11 will not be subject to clogging due to contamination by water, mud, snow or sand/or may be located within the tire 12.

The relatively stationary portion 46 of the central tire inflation system 10 is mounted at convenient points on the vehicle chassis, preferably above the fording level of the vehicle, and is fluidly connected to the rotating portion 48 by means of a single conduit 50 and a single rotating seal chamber 32.

The relatively stationary portion 46 includes a source of pressurized fluid 142 which is typically the vehicle air system compressor, or preferably, a pressurized air reservoir supplied by the compressor.

The source of pressurized fluid supplies compressed air, typically at a pressure not exceeding about 120 psi, to a split conduit 144 which defines branches 146 and 148 leading to the inlets 150 and 152, respectively, of inflate valves 154 and pressure regulator 156, respectively. Pressure regulator 156 defines an outlet 158 connected to a conduit 160 leading to the outlet 162 of deflate valve 164. The outlet 166 of inflate valve 154 and inlet 168 of deflate valve 164, respectively, are connected to a manifold conduit 170. Manifold conduit 170 is also connected to the inlet 172 of shutoff valve 174. Shutof valve 174 has an outlet 176 connected to atmosphere. Manifold conduit 170 is also connected to port 178 of quick-release valve 180. A pressure transducer 186 is exposed to the pressure in conduit 170 by means of a branch conduit 188.

Quick-release valve 180 defines a port 182 connected to exhaust and a port 184 connected to the conduit 50 leading to the wheel end assembly.

Pressure regulator 156 may be of any conventional design and will limit pressure in conduit 160 to a relatively low pressure of about 8-10 psi, and further includes a relief port 190 leading to exhaust. Accordingly, it may be seen that the inlet 150 to the inflation valve 154 is exposed to supply pressure while the outlet 162 of deflate valve 164 is in communication with a regulated pressure of about 8-10 psi. As will be seen, pressure regulator 156 regulates the quick-release valve 180 and thus regulates the minimum pressure to which system 10 will deflate tire 12.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

The operational characteristics of quick-release valve 180 are that a fluid flow (i.e. flow of higher pressurized fluid to a conduit or chamber at a lower pressurization) may be maintained from port 178 to port 184. However, a fluid flow may not be maintained from port 184 to port 178 as internal valve means will open port 184 to the exhaust port 182. Further, the valve 180, by establishing fluid commnication from port 178 to port 184 and from port 184 to exhaust 182 will tend to cause the pressurization at port 178 (conduit 170) and the pressurization at port 184 (conduit 50) to equalize at the pressurization of the lower pressurized conduit.

It is important to note that quick-release valve 180, through which the various valves at the wheel end assemblies are vented, is located remote from the wheel end assembly and may also be located remotely from the control valves, solenoid valves 154, 164 and 174. Quick-release valve 180 may be remotely controlled by a single pressure line 170 fluidly connecting port 178 of valve 180 with the solenoid valve via manifold conduit 170. As will be described in greater detail below, a separate quick release valve structure may be provided at each axle or as a portion of an alternate embodiment of each wheel end valve assembly.

By controlling the pressurization in conduit 170, the minimum pressure to which conduits 50 and 52 and all chambers fluidly connected thereto will automatically be vented through the quick-release valve 180 is also controlled. During the deflation mode of operation of system 10, the quick-release valve will exhaust conduits 50 and 52, which are then connected to the tire chamber 74 through control valve 11, to a pressure equalling the regulated pressure from regulator 156. During system shut-down (steady state operation), tire chamber 74 is isolated from the conduit 52 by control valve 11 and conduit 170 is exhausted to atmosphere through shut-off valve 174 allowing conduits 50 and 52 and the seal chamber 32 to be exhausted to atmosphere through the quick-release valve 180.

The pressure transducer 186 may be of any commercially available design and provides a signal, preferably an electric signal, indicative of the pressure in conduit 170.

Figure 2:
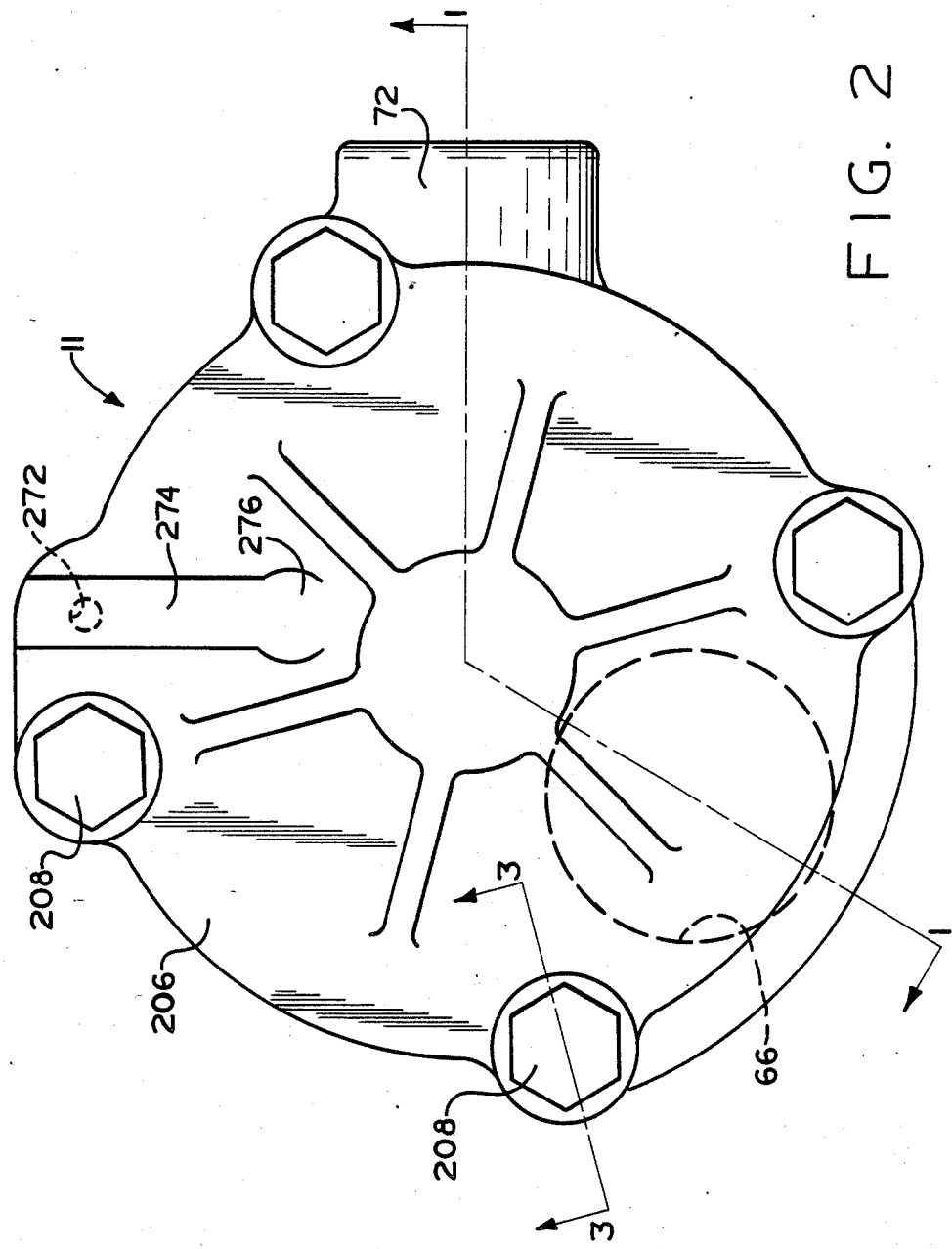
FIG. 2 is a top view of the valve assembly illustrated in FIG. 1.
Figure 3:
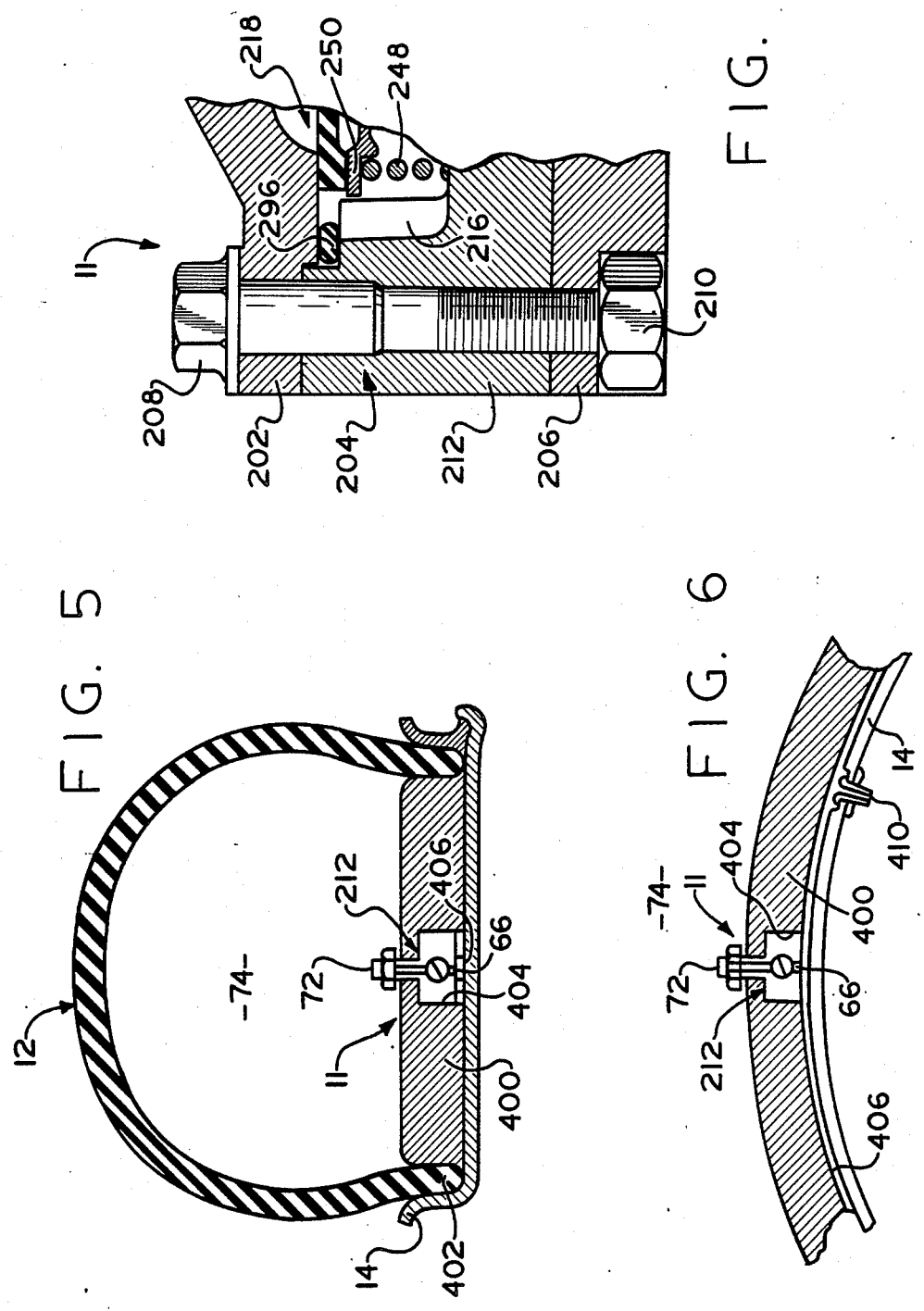
FIG. 3 is a partial sectional view of the valve assembly illustrated in FIG. 1 taken along the lines 3—3 in FIG. 2.

The structure and function of modular valve assembly 11 may be best be appreciated by reference to FIGS. 1-3. Wheel valve assembly 11 is comprised of three modules or sections 202, 204 and 206 which are clamped together by suitable fasteners such as machine scews 208 and nuts 210. The assembly 11 defines a valve body 212 having only two exterior fluid connections or ports 66 and 72. Port 66 for connection to conduit 62 and supply conduit 52 is provided in module 206. Port 72 for connection to conduit 68 and the interior chamber 74 of tire 12 is provied in module 204.

Valve assembly body 212 defines a central valve chamber 214 divided into a lower portion 216 and an upper portion 218 by a plug type diaphragm 220. Generally, the upper valve chamber portion 218 is provided to cover module 202.

Inlet or control port 66 fluidly communicates with the lower chamber portion 216 via aligned passages 222 and 224 defined in modules 206 and 204, respectively. The lower chamber portion 216 communicates with the tire port 72 through an annular valve seat 226 which is opened and closed by the plug portion 228 of the plug type diaphragm 220. Valve seat 226 is defined by the upward opening of a vertically extending bore 230 defined in module 204 which connects to a generally horizontally extending bore 232 in module 204 which connects with port 72. Preferably ports 66 and 72 are provided with internal pipe threads or the like.

A compression spring 234 acts on a spring seat 236 to bias the plug portion 228 of diaphragm 220 against the valve seat 226 with a force sufficient to normally maintain a blockage of fluid flow between lower chamber portion 216 (and port 66) and passages 230 and 232 (and port 72). Plug portion 228 and valve seat 226 of valve assembly 11 thus define a normally closed valve interposed the conduit 62 and the conduit 68 connected to the interior 74 of tire 12.

The bias of spring 234 can be overcome when the pressure in conduit 230, which is substantially equal to pressure in tire chamber 74, acting on the underside surface 238 of the plug portion 228 exceeds a predetermined reference valve. Valve 11 thus acts to automatically vent chamber 74 to conduit 62 in the event of greater than maximum allowable pressurization of tire 12 as might occur during manual inflation of the tire through fill valve 60. Preferably, spring 234 and surface 238 are selected such that a pressure of about 100 p.s.i. (pounds per square inch) will move plug 228 off of valve seat 226.

Diaphragm 220 defines a lower surface 240 exposed to fluid pressure at port 66 and in lower chamber portion 216 and an upper surface 242 which is exposed to fluid pressure in upper chamber portion 218. An annular valve seat 244, defined in module 202, is sealed by the outer periphery 246 of the diaphragm 220 under the bias of spring 248 acting on diaphragm plate/retainer 250 to normally fluidly separate the upper and lower portions, 216 and 218, of the valve chamber 214. A pressure of about 20 psi at port 66, assuming chamber portion 218 is not fluidly connected to inlet port 66, acting on the under surface 240 of diaphragm 220 will lift the plug member 228 off of the seat 226 communicating ports 72 and 66 for establishing fluid communication between the tire and stationary portion 46. As pressure at port 66 drops to below about 7 psi, spring 234 will again cause plug portion 228 to sealingly engage seat 226 to close the valve assembly 11. Accordingly, at less than about 7 psi pressure in conduits 50 and 52, the valve 11 will be closed and at pressures above 20 psi, the valve 11 will be open between ports 66 and 72. Accordingly, selective pressurization of single conduit 62 is effective to control the opening and closing of valve 11 as well as providing pressurized fluid for the inflation of tire 12 and/or a low pressure exhaust conduit for the deflation of tire 12.

Valve assembly 11 is effective to sense pressurization of tire chamber 74 falling below a predetermined minimum reference value and to fluidly isolate the tire 12 from the remainder of the CTIS system, by biasing valve assembly 11 closed, in the event such less than minimum reference pressure condition is sensed.

A pair of relatively closely spaced, substantially parallel passages 254 and 256 both open to the upper surface 258 of assembly module 206 to define a second and third valve seat, 260 and 262, respectively. Passage 254 is in fluid communication with control/supply port 66 via passage 264 formed in module 206 while passage 256 is in fluid communication with the upper valve chamber portion 218 and the upper surface 242 of plug type diaphragm 220 via passages 266, 268, 270, 272, 274 and 276.

Fluid communication between the valve seats 262 and 264 is normally blocked by the under surface 278 of a flat type diaphragm 280 received between the lower surface 282 of module 204 and upper surface 258 of module 206. Surfaces 258 and 282 define the interface 284 between module 204 and 206. The upper surface 286 of flat diaphragm 280 is exposed to fluid pressure in a chamber 288 formed in the lower surface 282 and fluidly communicating with the tire port 72 via passages 290 and 230. Upper surface 286 of diaphragm 280 is thus exposed to tire pressure in chamber 74 of tire 12.

The surface area of the upper surface 286 of diaphragm 280 exposed to tire pressure at port 72 is sized to be at least ten to fifteen times as large as the surface area of the portion of lower surface 278 exposed to supply pressure at port 66 (i.e. the area of seat 260). Accordingly, so long as at least a minimum pressure is present in tire chamber 74, even a ten to fifteen times greater supply pressure in manifold 62 communicating with port 66 will not cause communication between passages 254 and 256. Assuming the supply pressure at port 66 is never to exceed 110 psi, a pressure of greater than than 7 psi in the tire and in conduit 68 will maintain flat diaphragm 280 closed, i.e. seated on valve seat 260. However, in the event of extensive damage to tire 12 rendering the tire incapable of maintaining at least a minimum pressurization, pressurization of the supply conduit 62 will result in flap diaphragm 280 lifting off of valve seat 260 and fluidly communicating passages 254 and 256 which will cause supply pressure to be applied via conduits 264, 254, 256, 266, 268, 270, 272, 274 and 276 to the upper chamber portion 218. Supply pressure acting on the upper surface 242 of the diaphragm 220 will cause valve 11 to remain in the closed position blocking communication between port 66 and 72 thus automatically isolating the damaged tire. Thus, loss of system supply air through a damaged tire unable to maintain at least a predetermined minimum pressurization will be prevented allowing the remainder of the tire inflation system to inflate the remaining tires in a normal manner. When the tire inflation system is shut down, pressure on top of the diaphragm 220 acting on surface 246 bleeds off around the outer periphery 244 and valve seat 246. Of course, for the system to operate, an initial tire pressure about the minimum tire pressure, 7 psi for example, must be provided to the tire 12 through the initial inflate and pressure check valve 60.

It is important to note that valve assembly 11 utilizes only diaphragm type valving elements (i.e. not spools or the like) and that the diaphragms, 220 and 280, are located at the interfaces of modules 202 and 204 and of modules 204 and 206, respectively. Seals 294 and 296 are also utilized at the interfaces of modules 204 and 206 and 202 and 204.

The operation of the pneumatic components of central tire inflation system 10 is as follows. Under normal or steady state conditions, i.e. when tire inflation system 10 is not activated, the interior chamber 74 of tire 12, and thus manifold conduit 68, will be pressurized to some pressurization level greater than the minimum pressurization level, such as, for example, 75 psi for highway travel, 30 psi for cross country travel or 20 psi for operation in sand, mud or snow. If the pressurization of tire 12 is below the minimum pressure level (such as 7 psi) the tire must be pressurized to at least a minimum pressurization level by means of the manual inflate and pressurization check valve 60. In the steady state condition, the inflation valve 154 and the deflate valve 164 are closed and the shutoff valve 174 is open. Under these conditions, supply pressure is present in conduit 144 and regulated pressure is present in conduit 160. When the shutoff valve is open, conduit 170 is vented and port 178 quick release valve 180 is exposed to atmospheric pressure only. Whatever pressure may be present in conduits 62, 52 and 50 will be vented to atmosphere as a result of such pressure acting at port 184 causing connecting conduit 50 to exhaust through ports 184 and 182 of quick-release valve 180. As manifold portion 62 of conduit 52 is vented to atmosphere, there will be only atmospheric pressure present in port 66 of valve 11 and thus port 72 of valve 11 will be sealed to isolate the conduit 68 and the tire 12 at tire inflation pressure from the remainder of the system. As conduits 52 and 50 are vented through quick-release valve 180, the rotary seals 28 and 30 defining seal chamber 32 are exposed to atmospheric or substantially atmospheric pressure on both sides thereof.

Figure 9:
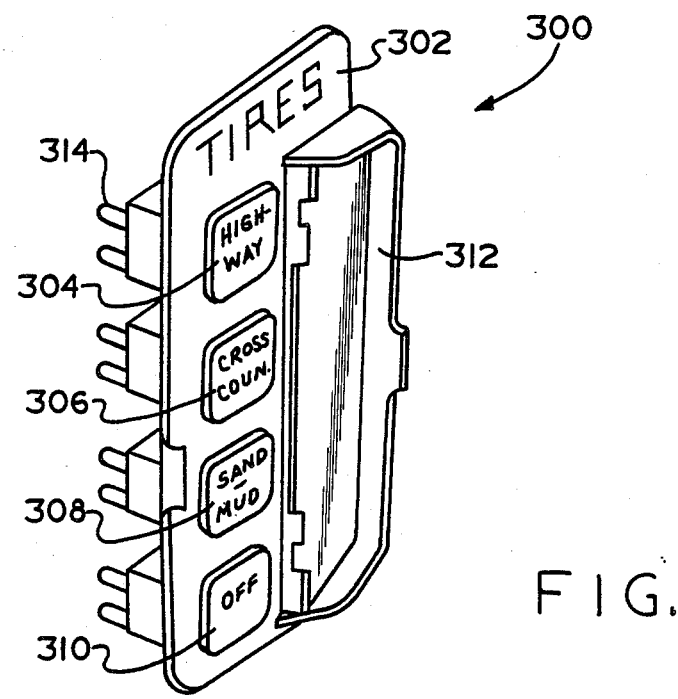
FIG. 9 is a prospective view of a possible operator control panel.

Preferably, the operator is provided with a control panel 300 in the vehicle operating cab which control panel may be seen in greater detail by reference to FIG. 9. A typical control panel will include a panel body 302, preferably mountable in the vehicle dashboard, having a multiplicity (here shown as 4) of lightable push buttons 304, 306, 308 and 310. In the embodiment shown, push button 304 is marked "highway", push button 306 is marked "cross country", push button 308 is marked "sand, mud" and push button 310 is marked "off". Of course, additional control buttons may be provided and the operator may be provided with a gauge or LED and LCD readout indicating current tire pressure inflation and/or the operator may be provided with a control whereby a specific inflation pressure may be requested. The panel 300 includes a hinged blackout cover 312 for security purposes. Each of the control buttons includes connector means 314 for connection into a central control unit as will be described in greater detail below.

In one embodiment of control panel 300, a steady light at one of the buttons 304, 306 or 308 will indicate the pressure setting presently being maintained by the system 10. The operator may push another button and its light will blink until the new pressure is attained at which time that button will glow steadily. If the operator pushes the off button 310, the control will select highway pressure and then deactivate the system and the off button will glow steadily. To provide maintenance of an operator or system selected pressure, the system will periodically monitor the pressure maintained in the various tires and take whatever correction action (inflate or deflate) that is required to maintain said selected pressure. Insufficient air supply and/or other malfunctions may be indicative by blinking of the off button. It is preferred that the control will sense vehicle speed and when the vehicle reaches a predetermined speed, such as 40 miles per hour, automatically inflate the tires to highway pressure and light the highway button 304. As a safety measure, the system will not respond to operator selection of cross country or sand-mud conditions by depression of buttons 306 or 308 above 40 miles per hour sensed vehicle speed.

When the operator selects an inflation pressure different from the current operating pressure, or during automatic periodic monitoring of current operating inflation pressures, the control unit must measure the current inflation pressures to determine if inflation and/or deflation is required to obtain or maintain the selected desired pressure.

Briefly, in the pressure measurement mode of operation of system 10, the controller will close the inflate valve 154, the deflate valve 164 and the shut-off valve 174. The inflate valve 154 will then be quickly pulsed (i.e. quickly opened and then reclosed) which will cause supply air pressure to act on port 178 of the quick release valve 180 thus pressurizing conduits 50, 52, and 62. Assuming the pressure in the tire and in conduit 68 is above the minimum pressure, the supply pressure at port 66 of the valve assembly 11 will act on the underside 240 of diaphragm 220 to open fluid communication between ports 66 and 72 of valve 11. Tire pressure in conduit 68 will retain the valve 11 in the open condition, and thus tire pressure or substantially tire pressure will be present in conduits 62, 52 and 50 and, by the action of quick-release valve 180, in conduits 170 and 188 leading to pressure transducer 186. Accordingly, pressure transducer 186 will be exposed to the tire pressure and will provide a signal indicative thereof to the control unit. It is understood, that for an accurate measurement of tire inflation pressure the system must be at equilibrium (i.e. with little or no fluid flow) which is the case with control valve 154, 164 and 174 in the closed positions thereof.

The controller will then compare the present tire inflation pressure indicated by the signal from pressure transducer 186 to the desired tire pressure to determine if inflation or deflaction is required. Should the controller determine that inflation is required, it will cause system 10 to assume its inflate mode of operation for a period of time. Should the controller determine that deflation is required, it will cause the system to assume its deflate mode of operation. Should the controller determine that no action is required, it will cause the system to assume its system shut-off mode of operation.

If, based upon a comparison of current monitored tire inflation pressure and operator or controller selected desired pressure, the system control unit determines that inflation of the monitored tires is required, the system 10 will assume the inflation mode of operation. In the inflate mode of operation, deflate valve 164 and shut-off valve 174 are closed and inflate valve 154 is opened for a period of time. At the end of the period of time the inflate valve 154 is closed and the inflation pressure of the tire, which is present in conduits 60, 62, 52, 50, 170 and 188 is sensed by pressure transducer 186 to determine what, if any, further action is required. Opening of inflate valve 154 with the shut-off valve 174 and deflate valve 164 closed will result in supply pressure in manifold conduit 170 which supply pressure will flow through quick-release valve 180 and into the conduit 50, through the rotary seal chamber 32, into conduit 52 and manifold portion 62 thereof and into port 66 of valve assembly 11. Assuming the inflation pressure present in conduit 68 is above the minimum inflation pressure, low tire pressure shut-off flat diaphragm 280 will remain seated and fluid pressure at port 66 will act upon the undersurface 240 of diaphragm 220 to open port 66 to port 72 for inflation of the tire 12 via conduit 68.

It is noted that a single pressure conduit path, conduit 52 is utilized to both open the control valve assembly 11 and to inflate the tire 12, and that inflation occurs at full supply pressure for rapid inflation of tire 12. At the end of the period of time, the inflation valve 154 is closed. As the inflate valve is closed while retaining the shut-off valve and deflate valve in the closed condition, the control valve 11 will remain open and the quick-release valve 180 will allow tire inflation pressure to be monitored by the pressure transducer 186.

Upon obtaining an inflation pressure corresponding to the selected tire pressure (usually plus or minus a given percentage) the tire inflation system 10 will assume the shut-off mode of operation. In the shut-off mode of operation, the solenoid inflate valve 154 and deflate valve 164 are closed and the solenoid normally open shut-off valve 174 is open. Accordingly, manifold conduit 170 is exhausted to atmosphere, the pressure in conduits 62, 52 and 50 will rapidly exhaust to atmosphere via exhaust port 182 of the quick-release valve 180 causing the valve 11 to close and the system 10 will assume the normal steady state condition. As indicated above, to maintain a desired pressure, it is preferred that while in the steady state mode, the control unit will automatically periodically cycle through the system pressure measurement mode of operation.

Should the control unit of system 10 determine by the measurement mode of operation that deflation of the tires is required, the system will assume the deflate mode of operation. In the deflate mode of operation, the solenoid inflate valve 154 is cycled on and then off to open valve 11 and the solenoid shut-off valve 174 is closed. Once valve 11 is open, conduits 50 and 170 are at substantially tire pressure, and the initial pressure can be sensed by pressure transducer 186. The solenoid deflate valve 164 is then opened allowing conduit 170 to vent through relief port 190 of regulator 156, reducing the pressure in conduit 170 and at port 178 of quick-release valve 180 to 8–10 psi. The deflate valve 164 is open for a period of time. Opening of the deflate valve will maintain the regulated pressure at port 178 of the quick-release valve 180 while the conduits 50, 52, 62 and 68 will quickly bleed down toward the regulated pressure as the control valve 11 will remain open following the system pressure measurement mode of operation. As a pressure differential will exist between the interior chamber 74 of tire 12 and the conduit 68, the tire 12 will continue to deflate and air will be exhausted through the quick-release valve port 182. After the period of time, the deflate valve will be closed and system pressure will be measured to determine if further deflation and/or inflation is required. It is important to note that the pressure in conduit 170 and thus in port 178 of the quick-release valve will cause the quick-release valve to close and prevent further venting of the tire 12 below a predetermined regulated pressure which pressure is above the minimum pressure of the tire 12 which will cause opening of the low tire pressure shut-off flat diaphragm 280.

It is important to appreciate that valve assembly 11 is in a single body 212 which requires but two connections, at ports 66 and 72, and no venting to atmosphere other than through the port 66. These features allow the tire valve assembly to be mounted at a relatively protected location on the tire rim or hub or inside the tire chamber 74.

An alternate mounting of the control and low tire pressure shut-off tire valve assembly 11 may be seen by reference to FIGS. 5 and 6. In FIGS. 5 and 6, the tire 12 is mounted to a rim 14 to define a sealed interior chamber 74 by means of a bead lock 400. Bead locks such as bead lock 400 are well known in the prior art and are often utilized with tires expected to be operated at relatively low pressures to maintain the bead portion 402 sealingly engaged with the rims and to prevent the tires from spinning on the rims at low tire inflation pressure. The bead lock 400 illustrated is of a molded rubber sleeve construction and bead locks of this type are available from the Hutchinson Corp. of Trenton, N.J.

The bead lock 400 is modified by providing a pocket or chamber 404 therein in which valve assembly 212 is received. Valve assembly 212 is functionally identical to valve assembly 11 described in detail above. Valve assembly 212 includes an inlet 66 port and an outlet 72 communicating with the interior 74 of the tire. The bead lock 400 is provided with an annular cavity or passage 406 communicating with the inlet port 66 of the valve assembly 212 and to a fitting 410 which is attachable to conduit 62. A separate manual initial pressurization and pressure check valve similar to valve 60 described above may be provided. Fitting 410 extends through an opening in rim 14.

Figure 4:
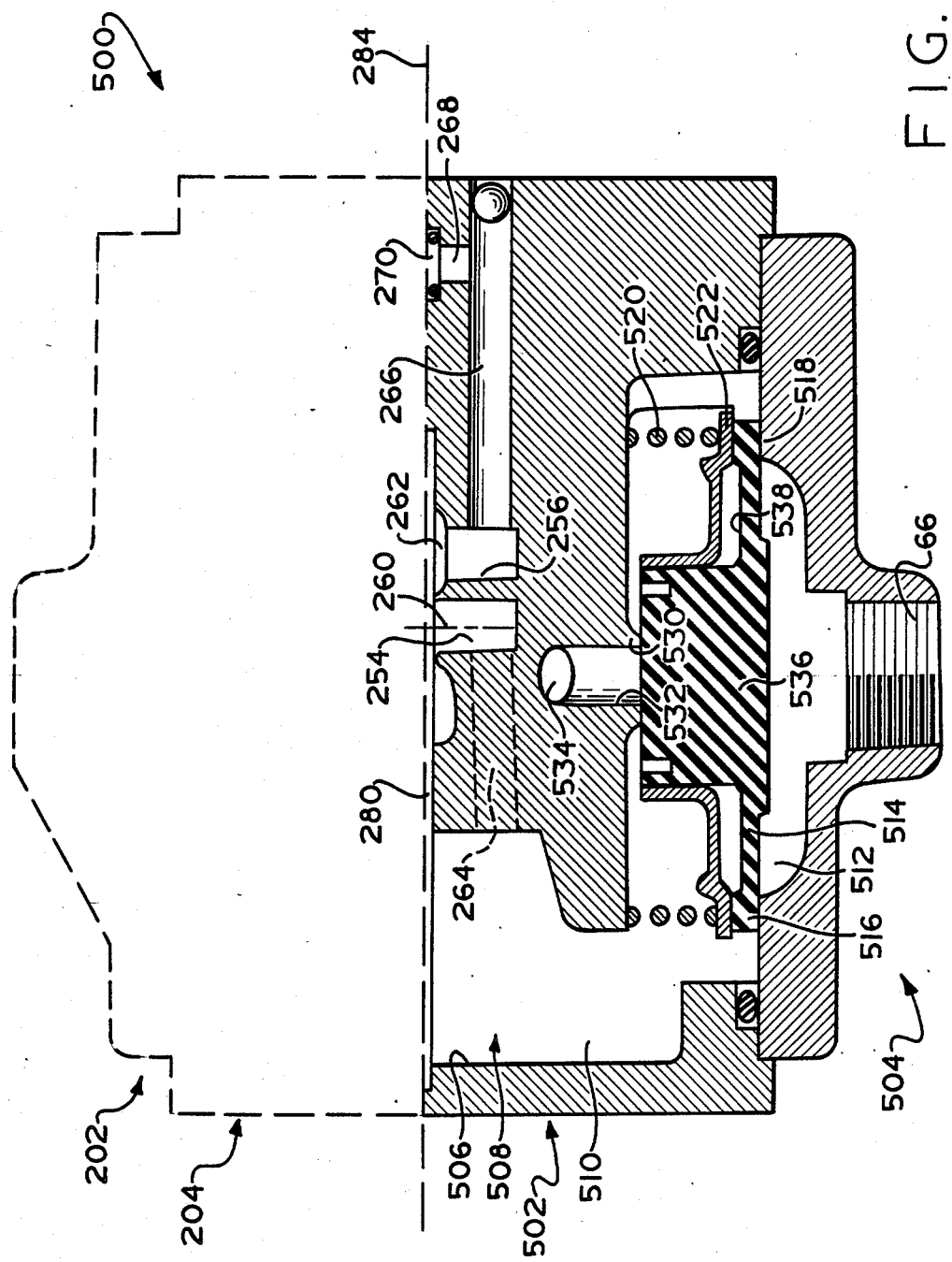
FIG. 4 is a sectional view of the alternate modules utilized to form the second embodiment of the valve assembly of the present invention.

An alternate modular wheel end valve assembly 500 may be seen by reference to FIG. 4. Assembly 500 is intended for those situations where very rapid venting or deflection of tire 12 is desired and mounting of the valve assembly outside of the tire and providing an exhaust at or near the tire rim 14 is acceptable.

Briefly, above the interface line 284, assembly 500 is structurally and functionally identical to assembly 11 and preferably utilizes identical modules 202 and 204. Assembly 500 additionally comprises modules 502 and 504 which are assembled to modules 202 and 204. Modules 502 and 504 replace module 206 utilized in assembly 11 described above and the upper portion of module 502 is identical to the upper portion of module 206 including flat diaphragm 280 controlling the flow of fluid between valve seats 260 and 262, and passages 264, 254, 256, 268 and 270. A passage 506 fluidly communicates with passage 224 in module 204.

Module 504 defines port 66 to valve assembly 500 and, in combination with module 502, defines a second valve chamber divided into upper and lower portions, 510 and 512, respectively, by a second plug type diaphragm 514. The outer periphery 516 is biased against an annular valve seat 518 by spring 520 acting on spring retainer/diaphragm plate 522 to normally fluidly seal upper chamber portion 510 from lower chamber portion 512. Upper chamber portion 510 communicates with passage 224 and lower chamber portion 512 fluidly communicates with port 66. Pressurization of conduit 62 and thus lower chamber 512 will allow pressurized fluid to flow from port 66 around the diaphragm 514 into upper chamber 510 and into passage 224 whereupon the operation of valve assembly 500 will be substantially identical to that of assembly 11 described above.

Module 502 defines a second valve seat 530 interposed upper chamber 510 and a passage 532 defined in module 502 and connected to an exhaust port 534, preferably connected to atmosphere at or near the wheel end assembly. Valve seat 530 is normally closed by plug portion 536 of diaphragm 514.

To effect a rapid exhaust of tire 12, a pulse of pressurized fluid is provided at port 66 to open diaphragm controlled valve seat 226 in module 204 to establish and maintain fluid communication between port 72 and upper chamber 510. The pressure in conduit 52, thus in lower chamber portion 512, is then reduced to below tire pressure, which is the pressure in upper chamber 510 which is fluidly connected to chamber 74 through opened valve seat 226. The tire pressure will act on the upper surface 538 of diaphragm 514 to move plug portion 536 out of sealing contact with seat 530 allowing rapid venting of chamber 74 through exhaust 534.

Other than for the provision of the exhaust valve structure and the requirement for providing an exhaust connection 534 to atmosphere, assembly 500 is substantially functionally and structurally identical to valve assembly 11 described above and utilizes two modules, 202 and 204, in common therewith. The valving members of assembly 500 are also all diaphragms (220, 280 and 514) and additional diaphram 514 is located at the intersection, or interface, of modules 502 and 504.

Although the preferred embodiment of the present invention have been described with a certain degree of particularity, it is understood, of course, that certain substitutions for and rearrangement of the parts may be resorted to without departing of the spirit and the scope of the present invention as hereinafter claimed.

I claim:

1. A modular wheel end valve assembly for a central tire inflation system comprising a valve body having only a first and a second fluid connection from the exterior to the interior thereof, said first fluid connection defined by a first port for connection to a selectively pressurized and exhausted conduit, said second fluid connection defined by a second port for connection to the interior pressurized chamber of an inflatable tire, said valve assembly comprising first valve means responsive to pressurization of said selectively pressurized and exhausted conduit to assume a first position for establishing fluid communication between said first and second ports and responsive to exhausting to atmosphere of said selectively pressurized and exhausted conduit to assume a second position for blocking fluid communication between said first and second ports thereof, said first valve means comprising a first diaphragm having a first surface exposed to fluid pressure at said first port and an opposed second larger surface, said valve assembly comprising second valve means constantly in fluid communication with said second port and responsive to a sensed pressurization of said interior chamber of said tire being less than a predetermined minimum reference pressure to automatically maintain said first valve means in said second position thereof, said assembly characterized by:

said second valve means comprising a second diaphragm having a third suface constantly exposed to fluid pressure at said first port and an opposed fourth surface substantially greater surface constantly exposed to fluid pressure at said second port, said second diaphragm normally biased by fluid pressure in said second port exceeding said minimum reference pressure to block fluid communication between said first port and said second surface and responsive to fluid pressure at said second port not exceeding said minimum reference value to establish fluid/communication between said first port and said second surface.

2. The assembly of claim 1 comprising a first module, a second module and a third module, said first diaphragm located at the interface of said first and second modules and said second diaphragm located at the interface of said second and third modules.

3. The assembly of claim 2, additionally comprising third valve means responsive to opening of said first valve means and pressurization of said second port exceeding pressurization of said first port to establish fluid communication between said second port and an exhaust port, said third valve means comprising a third diaphragm having a fifth surface exposed to pressure at said first port and an opposed larger sixth surface relatively exposed to pressure at said second port, said third module comprising a first and a second submodule, said third diaphragm located at the interface of said first and second submodules.

* * * * *